United States Patent
Brown et al.

(10) Patent No.: US 12,281,132 B2
(45) Date of Patent: Apr. 22, 2025

(54) PHOSPHONIUM-BASED ZWITTERIONIC MONOMERS AND POLYMERS, AND COMPOSITIONS AND METHODS THEREOF

(71) Applicant: University of Massachusetts, Boston, MA (US)

(72) Inventors: Marcel U. Brown, Amherst, MA (US); Todd Emrick, South Deerfield, MA (US)

(73) Assignee: University of Massachusetts, Westborough, MA (US)

( * ) Notice: Subject to any disclaimer, the term of this patent is extended or adjusted under 35 U.S.C. 154(b) by 309 days.

(21) Appl. No.: 18/100,592

(22) Filed: Jan. 24, 2023

(65) Prior Publication Data
US 2023/0192732 A1    Jun. 22, 2023

Related U.S. Application Data

(62) Division of application No. 17/015,988, filed on Sep. 9, 2020, now Pat. No. 11,603,379.

(60) Provisional application No. 62/897,479, filed on Sep. 9, 2019.

(51) Int. Cl.
  *C07F 9/54*  (2006.01)
  *C08L 25/18* (2006.01)

(52) U.S. Cl.
  CPC .......... *C07F 9/5407* (2013.01); *C07F 9/5442* (2013.01); *C08L 25/18* (2013.01)

(58) Field of Classification Search
  CPC ........................... C07F 9/5407; C07F 9/5442
  USPC ............................................................ 568/2
  See application file for complete search history.

(56) References Cited

U.S. PATENT DOCUMENTS 9,862,783 B2 *    1/2018    Tanna ................ C07F 15/0093

* cited by examiner

*Primary Examiner* — Ana Z Muresan
(74) *Attorney, Agent, or Firm* — Milstein Zhang & Wu LLC

(57) ABSTRACT

The invention provides novel zwitterionic monomers and polymers (including copolymers) with pendent phosphonium-based zwitterionic moieties, and compositions and products comprising same, as well as related methods and uses of the compositions, for example, as surfactants, coatings, and interlayer materials, biomedical materials or agents.

11 Claims, 2 Drawing Sheets

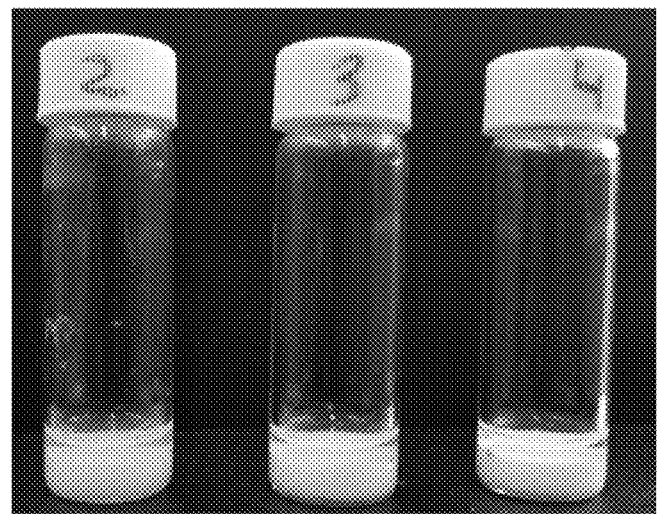

FIG. 1. Photograph of oil-in-water emulsions made with polymer zwitterion surfactants (polystyrene backbone with phosphonium sulfonate pendent groups in this example). Left vial: chloroform-in-water droplets using phosphonium sulfonate-substituted polystyrene where $R^2$ = n-butyl; middle vial: chloroform-in-water droplets using phosphonium sulfonate-substituted polystyrene where $R^2$ = phenyl; right vial: trichlorobenzene-in-water droplets using phosphonium sulfonate-substituted polystyrene where $R^2$ = phenyl.

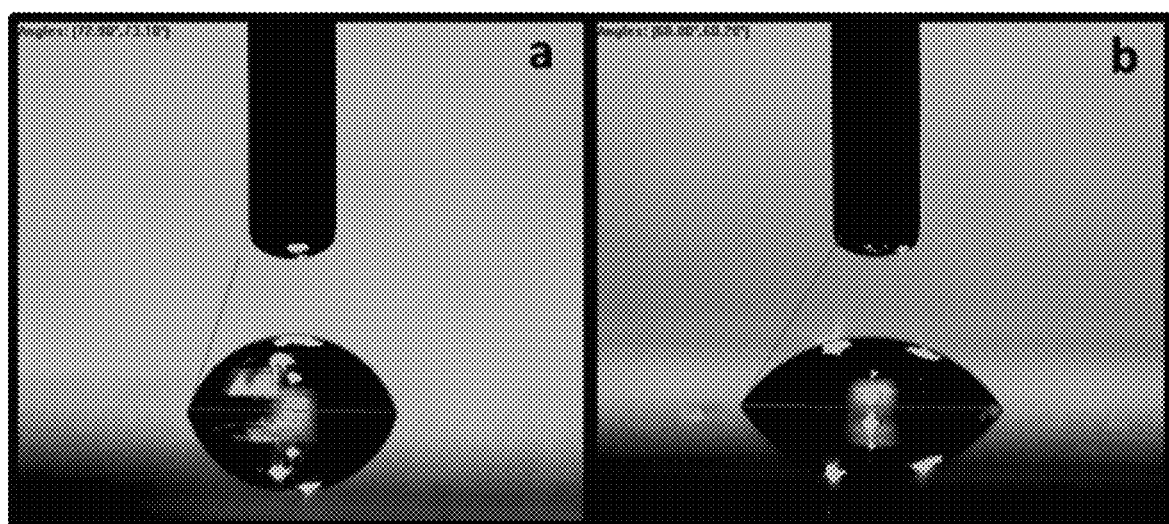
FIG. 2. Photographs of water droplets on a clean glass slide (a) and on glass coated with the phosphonium sulfonate-substituted polystyrene where $R^2$ = phenyl.

PHOSPHONIUM-BASED ZWITTERIONIC MONOMERS AND POLYMERS, AND COMPOSITIONS AND METHODS THEREOF

PRIORITY CLAIMS AND RELATED APPLICATIONS

This application claims the benefit of priority to U.S. Provisional Application No. 62/897,479, filed Sep. 9, 2019, the entire content of each of which is incorporated herein by reference for all purposes.

STATEMENT REGARDING FEDERALLY FUNDED RESEARCH OR DEVELOPMENT

This invention was made with government support under Grant No. NSF-CHE-CCI-1740630 awarded by the National Science Foundation. The Government has certain rights in the invention.

TECHNICAL FIELD OF THE INVENTION

The invention generally relates to chemicals and polymers. More particularly, the invention relates to zwitterionic monomers and polymers (including copolymers) with pendent phosphonium-based zwitterionic moieties, and compositions and products comprising same, as well as related methods and uses of the compositions, for example, as surfactants, coatings, and interlayer materials, biomedical materials or agents.

BACKGROUND OF THE INVENTION

Zwitterionic polymers are noted as having equal numbers of anionic and cationic groups within each monomer unit of the polymer chain. The polymers form a distinctive class of materials with numerous potential applications in diverse fields of additive chemicals, biomedical materials, nanomaterials, etc.

Characteristic properties of polymer zwitterions, such as their hydrophilicity and ability to prevent surface fouling, make them fundamentally interesting and useful for applications as surface coatings, in medical devices, and as drug delivery vehicles. Some of the most widely studied polymer zwitterions contain sulfobetaine or phosphorylcholine groups pendent to a methacrylic or styrenic polymer backbone.

Although significant research effort has been devoted to increasing functionalities of zwitterionic polymers, the range of different cations successfully integrated into zwitterionic polymers remains very limited and the positive charge of most polymer zwitterions is almost exclusively located on a nitrogen atom (e.g., of ammonium groups). Less common examples have sulfur as the cationic component. The generally strong hydrophilicity of conventional zwitterionic polymers limits their use in applications requiring solubility in organic solvents. Existing polymer zwitterions are soluble in very few organic solvents, thus leaving numerous fundamental properties less explored.

There is an ongoing need for zwitterionic polymers that expand the compositional diversities and, unlike typical polymer zwitterions, possess hydrophobic properties and solubility in conventional organic solvents, and as surfactants with tailored fluid-fluid interfacial activity and reactivity.

SUMMARY OF THE INVENTION

The invention provides novel alkyl and aryl phosphonium-based zwitterionic monomers and polymers. This new class of polymer zwitterions was accessed by ring-opening of substituted propane sultones with aliphatic and aromatic phosphines, affording phosphonium-substituted styrenic monomers, which were then polymerized by both conventional and controlled free radical methods. The phosphonium sulfonate-functionalized polymer zwitterions disclosed herein are soluble in polar organic solvents, distinguishing them from more typical hydrophilic polymer zwitterions, with variation in composition achieved via selection of phosphonium R-groups.

In one aspect, the invention generally relates to a compound having the structural formula:

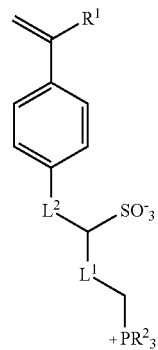

wherein $R^1$ is H or a methyl, each $R^2$ is independently an alkyl or aryl group, $L^1$ is $(CH_2)_i$, wherein i is an integer selected from 1 and 2. and $L^2$ is $(CH_2)_j$, wherein j is an integer selected from 0 to 6. In another aspect, the invention generally relates to a compound having the structural formula:

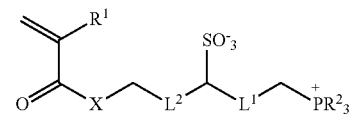

wherein X is O or NH, $R^1$ is H or a methyl, each $R^2$ is independently an alkyl or aryl group, $L^1$ is $(CH_2)_i$, wherein i is an integer selected from 1 and 2, and $L^2$ is $(CH_2)_j$, wherein j is an integer selected from 0 to 6.

In yet another aspect, the invention generally relates to a polymer comprising a repeating unit having the structural formula:

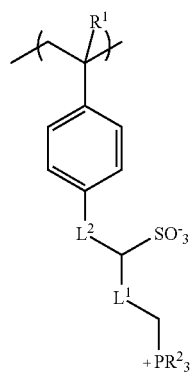

wherein R¹ is H or a methyl group, each R² is independently an alkyl or aryl group, L¹ is $(CH_2)_i$, wherein i is an integer selected from 1 and 2, and L² is $(CH_2)_j$, wherein j is an integer selected from 0 to 6.

In yet another aspect, the invention generally relates to a polymer having the structural formula:

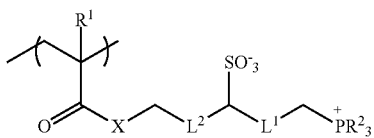

wherein X is O or NH, R¹ is H or a methyl, each R² is independently an alkyl or aryl group, L¹ is $(CH_2)_i$, wherein i is an integer selected from 1 and 2, and L² is $(CH_2)_j$, wherein j is an integer selected from 0 to 6.

In yet another aspect, the invention generally relates to a composition comprising a polymer disclosed herein.

In yet another aspect, the invention generally relates to an article of manufacture comprising a polymer disclosed herein.

In yet another aspect, the invention generally relates to a compound having the structural formula:

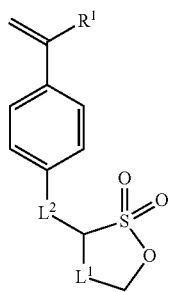

wherein R¹ is H or a methyl group, L¹ is $(CH_2)_i$, wherein i is an integer selected from 1 and 2, and L² is $(CH_2)_j$, wherein j is an integer selected from 0-6.

BRIEF DESCRIPTION OF THE DRAWINGS

FIG. 1 shows exemplary photograph of oil-in-water emulsions made with pSPS surfactants: chloroform in water with pSPS (R=n-butyl), chloroform in water with pSPS (R=phenyl), and TCB in water with pSPS (R=phenyl) (left-to-right).

FIG. 2 shows exemplary images depicting the water contact angles on a clean glass slide (a) and a pSPS (R=phenyl)-coated glass slide (b).

DEFINITIONS

Unless defined otherwise, all technical and scientific terms used herein have the same meaning as commonly understood by one of ordinary skill in the art to which this invention belongs. General principles of organic chemistry, as well as specific functional moieties and reactivity, are described in "Organic Chemistry", Thomas Sorrell, University Science Books, Sausalito: 2006.

Definitions of specific functional groups and chemical terms are described in more detail below. When a range of values is listed, it is intended to encompass each value and sub-range within the range. For example, "$C_{1-6}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

As used herein, the term "alkyl" refers to a straight or branched hydrocarbon chain group consisting solely of carbon and hydrogen atoms, containing no unsaturation, having from one to ten carbon atoms (e.g., $C_{1-10}$ alkyl). Whenever it appears herein, a numerical range such as "1 to 10" refers to each integer in the given range; e.g., "1 to 10 carbon atoms" means that the alkyl group can consist of 1 carbon atom, 2 carbon atoms, 3 carbon atoms, etc., up to and including 10 carbon atoms, although the present definition also covers the occurrence of the term "alkyl" where no numerical range is designated. In some embodiments, "alkyl" can be a $C_{1-6}$ alkyl group. In some embodiments, alkyl groups have 1 to 10, 1 to 8, 1 to 6, or 1 to 3 carbon atoms. Representative saturated straight chain alkyls include, but are not limited to, -methyl, -ethyl, -n-propyl, -n-butyl, -n-pentyl, and -n-hexyl; while saturated branched alkyls include, but are not limited to, -isopropyl, -sec-butyl, -isobutyl, -tert-butyl, -isopentyl, 2-methylbutyl, 3-methylbutyl, 2-methylpentyl, 3-methylpentyl, 4-methylpentyl, 2-methylhexyl, 3-methylhexyl, 4-methylhexyl, 5-methylhexyl, 2,3-dimethylbutyl, and the like. The alkyl group is attached to the parent molecule by a single bond. Unless stated otherwise in the specification, an alkyl group is optionally substituted by one or more of substituents which independently include: acyl, alkyl, alkenyl, alkynyl, alkoxy, alkylaryl, cycloalkyl, aralkyl, aryl, aryloxy, amino, amido, amidino, imino, azide, carbonate, carbamate, carbonyl, heteroalkyl, heteroaryl, heteroarylalkyl, heterocycloalkyl, hydroxy, cyano, halo, haloalkoxy, haloalkyl, ester, ether, mercapto, thio, alkylthio, arylthio, thiocarbonyl, nitro, oxo, phosphate, phosphonate, phosphinate, silyl, sulfinyl, sulfonyl, sulfonamidyl, sulfoxyl, sulfonate, urea, —Si(R$^a$)$_3$, —OR$^a$, —SR$^a$, —OC(O)—R$^a$, —N(R$^a$)$_2$, —C(O)R$_a$, —C(O)OR$^a$, —OC(O)N(R$^a$)$_2$, —C(O)N(R$^a$)$_2$, —N(R$^a$)C(O)OR$^a$, —N(R$^a$)C(O)R$^a$, —N(R$^a$)C(O)N(R$^a$)$_2$, —N(R$^a$)C(NR$^a$)N(R$^a$)$_2$, —N(R$^a$)S(O)$_t$N(R$^a$)$_2$ (where t is 1 or 2), —P(=O)(R$^a$)(R$^a$), or —O—P(=O)(OR$^a$)$_2$ where each R$^a$ is independently hydrogen, alkyl, haloalkyl, carbocycyl, carbocycylalkyl, aryl, aralkyl, heterocycloalkyl, heterocycloalkylalkyl, heteroaryl or heteroarylalkyl, and each of these moieties can be optionally substituted as defined herein. In a non-limiting embodiment, a substituted alkyl can be selected from fluoromethyl, difluoromethyl, trifluoromethyl, 2-fluoroethyl, 3-fluoropropyl, hydroxymethyl, 2-hydroxyethyl, 3-hydroxypropyl, benzyl, and phenethyl.

As used herein, the terms "aromatic" or "aryl" refer to a group with 6 to 14 ring atoms (e.g., $C_{6-14}$ aromatic or $C_{6-14}$ aryl) that has at least one ring having a conjugated pi electron system which is carbocyclic (e.g., phenyl, fluorenyl, and naphthyl). In some embodiments, the aryl is a $C_{6-10}$ aryl group. For example, bivalent groups formed from substituted benzene derivatives and having the free valences at ring atoms are named as substituted phenylene groups. In other embodiments, bivalent groups derived from univalent polycyclic hydrocarbon groups whose names end in "-yl" by removal of one hydrogen atom from the carbon atom with the free valence are named by adding "-idene" to the name of the corresponding univalent group, e.g., a naphthyl group with two points of attachment is termed naphthylidene. Whenever it appears herein, a numerical range such as "6 to 14 aryl" refers to each integer in the given range; e.g., "6 to 14 ring atoms" means that the aryl group can consist of 6 ring atoms, 7 ring atoms, etc., up to and including 14 ring atoms. The term includes monocyclic or fused-ring polycyclic (i.e., rings which share adjacent pairs of ring atoms) groups. Polycyclic aryl groups include bicycles, tricycles, tetracycles, and the like. In a multi-ring group, only one ring is required to be aromatic, so groups such as indanyl are encompassed by the aryl definition. Non-limiting examples of aryl groups include phenyl, phenalenyl, naphthalenyl, tetrahydronaphthyl, phenanthrenyl, anthracenyl, fluorenyl, indolyl, indanyl, and the like. Unless stated otherwise in the specification, an aryl moiety can be optionally substituted by one or more substituents which independently include: acyl, alkyl, alkenyl, alkynyl, alkoxy, alkylaryl, cycloalkyl, aralkyl, aryl, aryloxy, amino, amido, amidino, imino, azide, carbonate, carbamate, carbonyl, heteroalkyl, heteroaryl, heteroarylalkyl, heterocycloalkyl, hydroxy, cyano, halo, haloalkoxy, haloalkyl, ester, ether, mercapto, thio, alkylthio, arylthio, thiocarbonyl, nitro, oxo, phosphate, phosphonate, phosphinate, silyl, sulfinyl, sulfonyl, sulfonamidyl, sulfoxyl, sulfonate, urea, —Si($R^a$)$_3$, —O$R^a$, —S$R^a$, —OC(O)—$R^a$, —N($R_a$)$_2$, —C(O)$R_a$, —C(O)O$R^a$, —OC(O)N($R^a$)$_2$, —C(O)N($R^a$)$_2$, —N($R^a$)C(O)O$R^a$, —N($R^a$)C(O)$R^a$, —N($R^a$)C(O)N($R^a$)$_2$, —N($R^a$)C(N$R^a$)N($R^a$)$_2$, —N($R^a$)S(O)$_t$N($R^a$)$_2$ (where t is 1 or 2), —P(=O)($R^a$)($R^a$), or —O—P(=O)(O$R^a$)$_2$ where each $R^a$ is independently hydrogen, alkyl, haloalkyl, carbocyclyl, carbocyclylalkyl, aryl, aralkyl, heterocycloalkyl, heterocycloalkylalkyl, heteroaryl or heteroarylalkyl, and each of these moieties can be optionally substituted as defined herein.

DETAILED DESCRIPTION OF THE INVENTION

The invention describes a novel class of phosphonium-based zwitterionic monomers and polymers. A core feature of these monomers and polymers is that they employ phosphorous as the cationic component of the zwitterion, thus expanding the chemical space and functionality of zwitterionic polymers. Solution and physical properties of polymer zwitterions depend strongly on the specifics of the zwitterionic moiety. Phosphonium-based zwitterionic polymers promise to significantly broaden the utilities of these materials, including as novel polymer surfactants, coatings, and interlayer materials.

The chemical versatility of existing polymer zwitterions has generally been found in the anionic component (i.e., phosphonate, sulfonate, and carboxylate), while the cationic component is most typically ammonium. To date, phosphonium-containing polymer zwitterions have not been reported. This is likely due in part to the challenges associated with handling the requisite phosphorous reagents (for example, strong oxophilicity) and lack of suitable reactive precursors.

A key aspect of the invention is the preparation of phosphonium sulfonate polymer zwitterions. Access to this novel class of polymer zwitterions offers valuable structural variation to this important class of polymers, as well as tunable properties based on the selection of the phosphonium 'R'-groups.

Significantly, the present invention offers a wide range of opportunities for novel zwitterions by variation of the substituents on the phosphorous atom. In combination with the polymer backbone, anion, and connectivity (e.g., spacer groups between the cation/anion pair and linkers between the zwitterion and the backbone), an array of polymers with diverse chemical, physical and electronic properties are synthetically accessible. These novel polymers exhibit tunable hydrophobic properties and solubility in polar organic solvents, making them important new additions to polymer zwitterions.

These new polymer zwitterions are synthesized efficiently by ring-opening of functional versions of 1,3-propane sultone with alkyl and aryl phosphines, followed by free radical polymerization by either conventional or controlled ("living") polymerization methodology. The resultant phosphonium sulfonate-substituted polymers exhibit hydrophobic properties and solubility in polar organic solvents, which is atypical of polymer zwitterions and opens new applications (e.g., as surfactants) that cannot be achieved with conventional hydrophilic structures.

In one aspect, the invention generally relates to a compound having the structural formula:

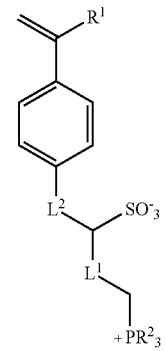

wherein $R^1$ is H or a methyl, each $R^2$ is independently an alkyl or aryl group, $L^1$ is (CH$_2$)$_i$, wherein i is an integer selected from 1 and 2, and $L^2$ is (CH$_2$)$_j$, wherein j is an integer selected from 0 to 6 (e.g., 0, 1, 2, 3, 4, 5, 6).

In certain embodiments, $R^1$ is H. In certain embodiments, 10 is a methyl group.

In certain embodiments, each $R^2$ is a $C_1$-$C_{18}$ (e.g., $C_1$-$C_3$, $C_3$-$C_6$, $C_6$-$C_{12}$, $C_{12}$-$C_{18}$) alkyl group.

In certain embodiments, each $R^2$ is an aryl (e.g., phenyl) group.

In certain embodiments, the $R^2$s are the same.

In certain embodiments, the $R^2$s are not the same.

In certain embodiments, i is 1. In certain embodiments, i is 2.

In certain embodiments, j is an integer selected from 0, 1, 2 and 3.

In another aspect, the invention generally relates to a compound having the structural formula:

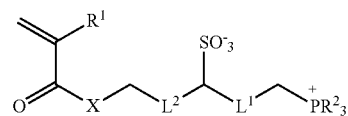

wherein X is O or NH, $R^1$ is H or a methyl, each $R^2$ is independently an alkyl or aryl group, $L^1$ is (CH$_2$)$_i$, wherein i is an integer selected from 1 and 2, and $L^2$ is (CH$_2$)$_j$, wherein j is an integer selected from 0 to 6 (e.g., 0, 1, 2, 3, 4, 5, 6).

In certain embodiments, X is O and the compound has the following general formula

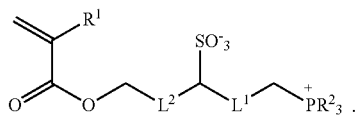

In certain embodiments, X is NH and the compound has the following general formula

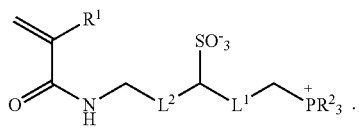

In certain embodiments, $R^1$ is H. In certain embodiments, 10 is a methyl group.

In certain embodiments, each $R^2$ is a $C_1$-$C_{18}$ (e.g., $C_1$-$C_3$, $C_3$-$C_6$, $C_6$-$C_{12}$, $C_{12}$-$C_{18}$) alkyl group.

In certain embodiments, each $R^2$ is an aryl (e.g., phenyl) group.

In certain embodiments, the $R^2$s are the same.

In certain embodiments, the $R^2$s are not the same.

In certain embodiments, i is 1. In certain embodiments, i is 2.

In certain embodiments, j is an integer selected from 0, 1, 2 and 3.

In yet another aspect, the invention generally relates to a polymer comprising a repeating unit having the structural formula:

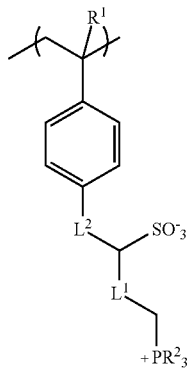

wherein $R^1$ is H or a methyl, each $R^2$ is independently an alkyl or aryl group, $L^1$ is $(CH_2)_i$, wherein i is an integer selected from 1 and 2, and $L^2$ is $(CH_2)_j$, wherein j is an integer selected from 0 to 6 (e.g., 0, 1, 2, 3, 4, 5, 6).

In certain embodiments, $R^1$ is H. In certain embodiments, 10 is a methyl group.

In certain embodiments, each $R^2$ is a $C_1$-$C_{12}$ (e.g., $C_1$-$C_3$, $C_3$-$C_6$, $C_6$-$C_{12}$) alkyl group.

In certain embodiments, each $R^2$ is an aryl (e.g., phenyl) group.

In certain embodiments, the $R^2$s are the same.

In certain embodiments, the $R^2$s are not the same.

In certain embodiments, i is 1. In certain embodiments, i is 2.

In certain embodiments, j is an integer selected from 0, 1, 2 and 3.

In yet another aspect, the invention generally relates to a polymer having the structural formula:

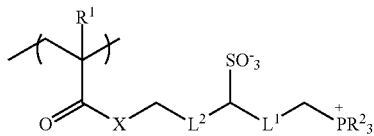

wherein X is O or NH, $R^1$ is H or a methyl, each $R^2$ is independently an alkyl or aryl group, $L^1$ is $(CH_2)_i$, wherein i is an integer selected from 0 to 2, and $L^2$ is $(CH_2)_j$, wherein j is an integer selected from 0 to 6 (e.g., 0, 1, 2, 3, 4, 5, 6).

In certain embodiments, X is O.

In certain embodiments, X is NH.

In certain embodiments, $R^1$ is H. In certain embodiments, 10 is a methyl group.

In certain embodiments, each $R^2$ is a $C_1$-$C_{18}$ (e.g., $C_1$-$C_3$, $C_3$-$C_6$, $C_6$-$C_{12}$, $C_{12}$-$C_{18}$) alkyl group.

In certain embodiments, each $R^2$ is an aryl (e.g., phenyl) group.

In certain embodiments, the $R^2$s are the same.

In certain embodiments, the $R^2$s are not the same.

In certain embodiments, i is 1. In certain embodiments, i is 2.

In certain embodiments, j is an integer selected from 0, 1, 2 and 3.

In certain embodiments, the polymer is a homopolymer.

In certain embodiments, the polymer is a copolymer. In certain embodiments, the copolymer is a random copolymer. In certain embodiments, the copolymer is a block copolymer.

In yet another aspect, the invention generally relates to a composition comprising a polymer disclosed herein.

In yet another aspect, the invention generally relates to an article of manufacture comprising a polymer disclosed herein.

In yet another aspect, the invention generally relates to a compound having the structural formula:

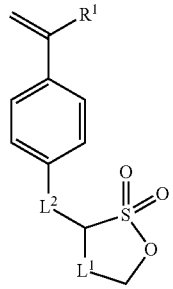

wherein 10 is H or a methyl group, $L^1$ is $(CH_2)_i$, wherein i is an integer selected from 1 and 2, and $L^2$ is $(CH_2)_j$, wherein j is an integer selected from 0-6 (e.g., 0, 1, 2, 3, 4, 5, 6).

In certain embodiments, $R^1$ is H. In certain embodiments, 10 is a methyl group.

In certain embodiments, i is 1. In certain embodiments, i is 2.

In certain embodiments, j is an integer selected from 0, 1, 2 and 3.

The following examples are meant to be illustrative of the practice of the invention and not limiting in any way.

EXAMPLES

Scheme 1 shows exemplary synthetic transformations that can lead to the phosphonium-based zwitterionic polymers of the invention.

Scheme 1

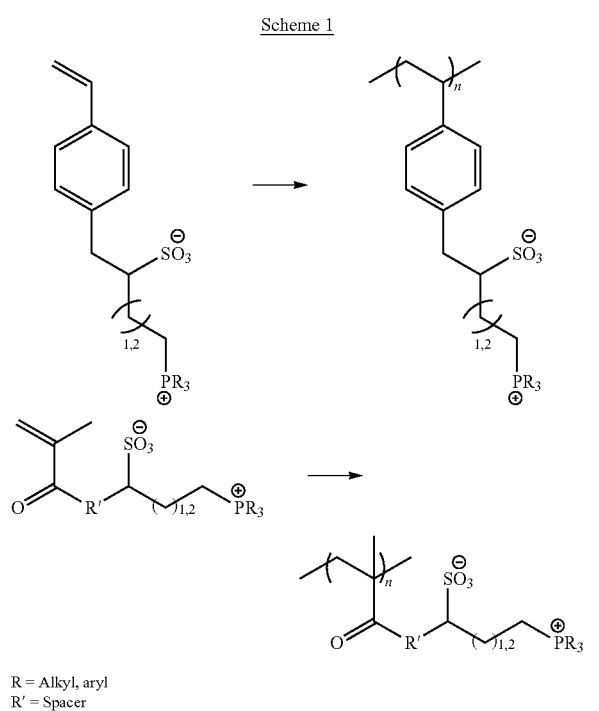

wherein each R is independently an alkyl or aryl group and each R' is independently a spacer group.

An exemplary synthetic pathway to a styrenic phosphonium sulfonate monomer (3) and an intermediate is shown in Scheme 2. Significantly, a novel intermediate compound, 4-vinylbenzyl sultone (2), opens pathways to various other functional zwitterionic molecules as well, such as ammonium and sulfonium sulfonates.

Scheme 2

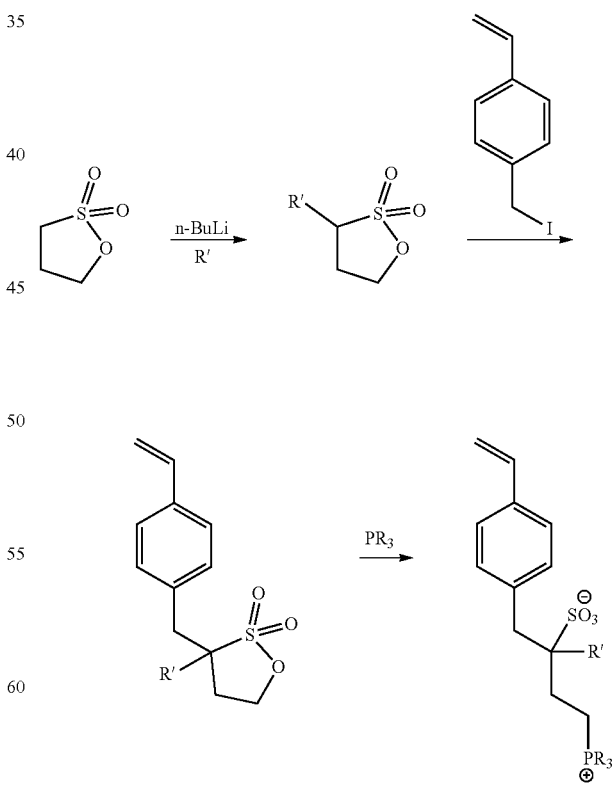

Reaction of 4-vinylbenzyl iodide (1), obtained from the chloride precursor, with the anion of 1,3-propanesultone gave 4-vinylbenzyl sultone (2), which was then subjected to ring-opening with trialkylphosphines containing a variety of R-groups (e.g., R=n-butyl, n-octyl, or phenyl). 1,3-Propanesultone may be replaced with 1,4-butanesultone en route to its corresponding monomer. Such variation of spacer length between cation and anion may be used to tailor physical properties of the resultant polymers.

Another exemplary synthetic pathway to a styrenic phosphonium sulfonate monomer (3) and an intermediate is shown in Scheme 3 below.

Scheme 3

Monosubstitution of 1,3-propanesultone with various groups, such alkyl, aryl, alkenyl and alkynyl groups, provides the starting material for the synthesis of a library of functional phosphonium sulfonate monomers. A second substitution step, as shown in Scheme 3 with the example of 4-vinylbenzyl iodide, incorporates the polymerizable moiety into the structure prior to the final ring-opening step of the bifunctional sultone with trisubstituted phosphines, which then affords the functional phosphonium sulfonate monomers.

particular zwitterionic monomer, using conventional free radical initiators. Following polymerization, residual monomer was removed by dialysis in MeOH, then in water. The polymers can also be prepared using controlled free radical methods, such as reversible addition-fragmentation chain transfer (RAFT) polymerization. Successful polymerization was confirmed by $^1$H NMR spectroscopy, in which the anticipated broadening of resonances was observed, as well as an absence of vinyl proton signals from the monomer.

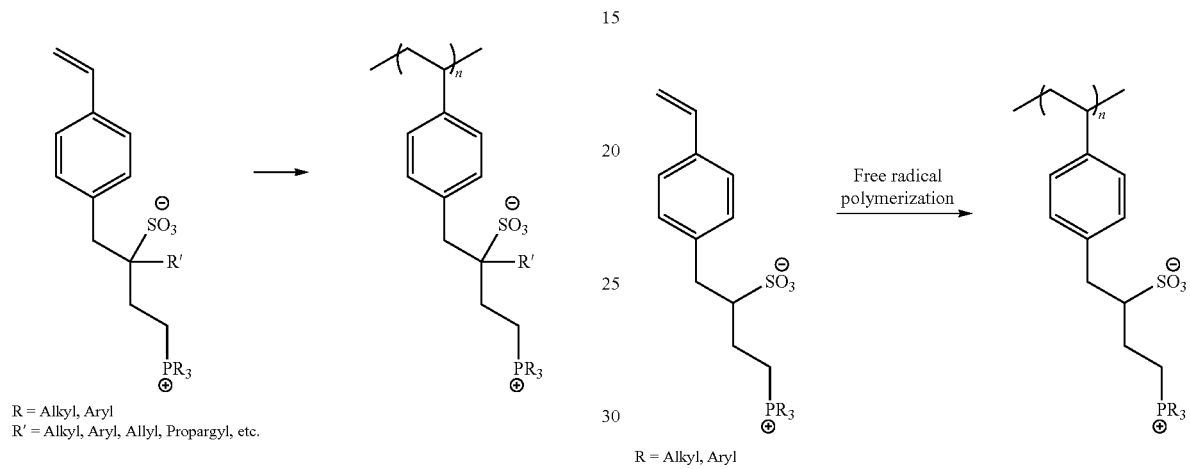

Polymerization of the phosphonium sulfonate-substituted monomers using conventional radical initiators will afford the phosphonium sulfonate-substituted polymers. The functional groups will augment inter-polymer chain interactions and provide useful platforms for post-polymerization modification, which can be used for polymer crosslinking or attachment to substrates and small molecules for various applications.

Some of these phosphonium sulfonate polymers are insoluble in water, but soluble in polar organic solvents, including methanol, dimethylsulfoxide, trifluoroethanol (TFE), chloroform and dichloromethane. Particular solubilities result from the composition of the R substituents on the phosphorous atom. This hydrophobic character is atypical of zwitterionic polymers and thus opens opportunities for new applications. Interestingly, the triphenylphosphonium sulfonate polymer (R=phenyl) shows a lower critical solution temperature (LCST) of approximately 20° C. in chloroform. LCST is the critical temperature below which the components of a mixture are miscible for all compositions. Compared to more typical polymer zwitterions that exhibit an upper critical solution temperature (UCST)), such a low LCST allow for responsive materials applications at or near room temperature.

In exemplary syntheses, the free radical polymerization reaction was carried out in (dimethyl sulfoxide DMSO), MeOH, or chloroform/TFE mixtures, as suitable for the Solutions of the tri-n-octylphosphonium sulfonate polymer in chloroform were mixed and vortexed with deionized water and yielded oil-in-water emulsions that remained stable for days or longer.

In exemplary applications, the zwitterionic polymers of the invention can be used in coatings and interlayers (e.g., in conjunction with metals and semiconductors) both bulk surfaces and nanoparticulates). Coatings and interlayers of this type may lead to higher efficiency devices with more stable electrodes and slower degradation of device components relative to conventional devices.

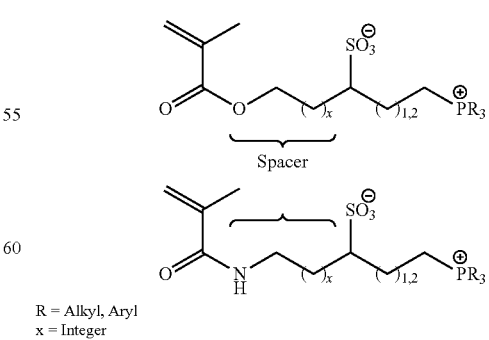

Exemplary trialkyl phosphonium sulfonate monomers and polymers include:

TABLE 1

Exemplary monomers and polymers

| Monomer | Polymer |
|---|---|
| Styrenic tri-n-butylphosphonium sulfonate | |
| Styrenic tri-n-octylphosphonium sulfonate | |
| Styrenic triphenylphosphonium sulfonate | |

Monomer and Polymer Synthesis

Scheme 4 illustrates an example synthesis of the styrenic phosphonium sulfonate monomers (7a-c), in which phosphonium installation in the final step circumvents unwanted phosphine side reactions.

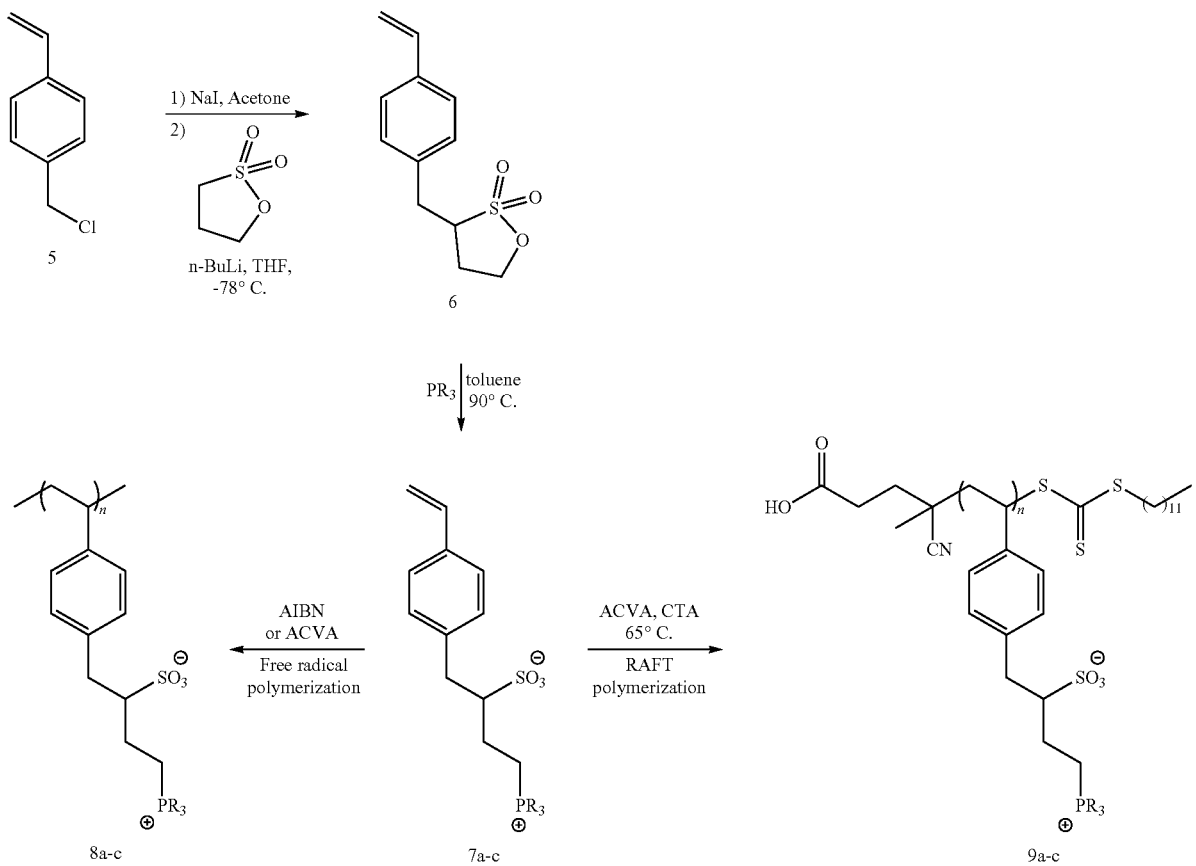

Scheme 4

This route relies on the preparation of a functional propanesultone precursor to participate in ring-opening with phosphine ($PR_3$) nucleophiles. Specifically, deprotonation of 1,3-propanesultone with n-BuLi in THF, followed by addition of 4-vinylbenzyl iodide (prepared by halide exchange from 4-vinylbenzyl chloride), yielded a mixture of mono- and difunctional sultones that were separated easily by chromatography. The sultone-substituted styrene 7 was isolated as a white solid in 76% yield and its structure confirmed by $^1$H NMR spectroscopy, noting characteristic vinyl proton signals at 6.69 ppm, 5.74 ppm and 5.26 ppm, and aromatic resonances at 7.38 ppm and 7.19 ppm. The alkyl protons of the sultone are split into five separate signals between 4.5 ppm and 2.3 ppm. The loss of a single proton integral compared to 1,3-propane sultone is indicative of the substitution alpha to the sulfur atom and the presence of a chiral center. Sultone 6 was stored stably by refrigeration at −80° C. for extended timeframes and when desired was subjected to ring-opening with an excess of the selected phosphine at 90° C. in toluene. During the ring-opening reactions, the phosphonium sulfonate (PS) monomers conveniently precipitated as colorless solids and were collected as white powders in >90% yield. $^{31}$P NMR spectroscopy also pointed to successful syntheses of monomers of type 7, with clean single resonances at 34.0, 33.7, and 24.1 ppm representing R=n-butyl (7a), n-octyl (7b), and phenyl (7c), respectively. Notably, these monomer syntheses were conducted without difficulty on an appreciable scale of ~10 grams.

PS monomers 7a-c were subjected to free radical polymerization under conventional conditions by initiation with 2,2'-azobis(2-methylpropionitrile) (AIBN) or 4,4'-azobis(4-cyanovaleric acid) (ACVA), producing the corresponding polymer product as a white solid. The tri-n-butyl and triphenyl derivatives were also polymerized successfully by reversible addition-fragmentation chain-transfer (RAFT) polymerization. No such polymerization control could be achieved for the tri-n-octyl case, due to solubility issues in solutions needed to conduct RAFT. Interesting solvent-dependent solution transitions were observed, such as for the triphenyl phosphonium-substituted styrenic polymers, prepared by free radical polymerization, for which a lower critical solution temperature (LCST) of 19° C. was determined by cloud point measurements on a polymer solution of 1 mg/mL in chloroform.

RAFT polymerization was conducted at a monomer concentration of 1.6 mol/L with 4-cyano-4-(dodecylsulfanylthiocarbonyl)sulfanyl pentanoic acid as chain-transfer agent (CTA) and ACVA as initiator (3:1 ratio) in degassed methanol at 70° C.; this method produced polymer zwitterions with excellent control over molecular weight and with low PDI values (≤1.13). The CTA-to-monomer ratio was varied to achieve degrees of polymerization between 20 and 60.

The results in Table 1 show that good control over molecular weight and dispersity was generally achieved, while the measured Mn values are larger than targeted, based on the PMMA calibration standards employed to estimate polymer molecular weight, and PDI increases with molecular weight.

The polymerization of monomer 7 reached high conversion (>90%) by RAFT polymerization, as judged by $^1$H NMR spectroscopic integration of the aromatic signals of the monomer and polymer against the vinyl signals of the monomer. The polymers were purified by dialysis against water for the tri-n-butyl derivative, and consecutively against methanol and water for the triphenyl derivative, yielding light yellow solids in yields of 70-90%. Molecular weights for these polymers were estimated by GPC (TFE as eluent; PMMA as calibration standards), while the polymers made by free radical polymerization exhibited low solubility in GPC solvents. The library of SPS monomers and resulting polymers exhibit varying solubility, depending on the phosphorous substituents.

TABLE 1

Data for RAFT polymerization of SPS monomers.

| R= | Target $M_n$ (kDa) | % conv. | $M_n$ (kDa) | PDI |
|---|---|---|---|---|
| Butyl | 8.8 | 90 | 12 | 1.05 |
| | 17.6 | 92 | 19.9 | 1.07 |
| | 26.4 | 92 | 27.9 | 1.08 |
| Phenyl | 10.0 | 98 | 13.9 | 1.05 |
| | 20.0 | 96 | 21.1 | 1.10 |
| | 30.0 | 90 | 27.1 | 1.13 |

All SPS monomers and polymers are soluble in select polar organic solvents, such as chloroform, methanol or dimethylformamide, but only the tri-n-butyl derivative is water soluble. This solubility behavior is attributed to the varying size of hydrophobic substituents imparting the molecules with different degrees of hydrophobic character. Additionally, the screening of the positive charge by the R-substituents might impact inter-zwitterion interactions, and thus solubility. These novel polymers may be used as surfactants, which was examined by preparing emulsions from mixtures of water and various oils such as 1,2,4-trichlorobenzene (TCB) and chloroform, in the presence of the polymer zwitterion surfactant. To prepare the emulsions, the tri-n-butylphosphonium sulfonate polymer was dissolved initially in the aqueous phase, while the tri-n-octyl and the triphenyl derivatives were dissolved initially in the organic phase. After adding the same amount of the second liquid phase to the 10 mg/mL polymer solutions, the mixtures were vortexed several times to produce oil-in-water (o/w) emulsions that were stable for days to weeks (FIG. 1).

When preparing emulsions with the triphenyl derivative at the same surfactant concentration, but increasing the o/w ratio to 2:1, the emulsion phase floats to the top of the mixture, indicating a w/o emulsion, since the density of chloroform is higher than water. However, these emulsions coalesce rapidly and revert to the phase separated system within hours. Pendant drop tensiometry of the chosen solvent systems was conducted with a polymer concentration of 0.5 mg/mL to quantify the effect of the polymer surfactant on the water-oil interfacial tension.

Additionally, polymer zwitterion films were spin-coated on glass slides at 1000 rpm from solutions in chloroform with a polymer concentration of 15 mg/mL. The film thicknesses were quantified by ellipsometry, revealing film thicknesses of >100 nm. The contact angle of water droplets on the substrates was measured to evaluate the hydrophobicity or hydrophilicity of the polymer coatings (FIG. 2).

Thermogravimetric analysis (TGA) of the triphenylphosphonate-substituted SPS polymer, synthesized by free radical and RAFT polymerization, was conducted to explore the temperature range in which these new materials can be used without degradation. The polymer synthesized by free radical polymerization displayed a degradation onset temperature in nitrogen of 343° C., while that of the polymer made by RAFT was measured to be 353° C., implying that these polymer zwitterions are amenable to high temperature processing in the absence of rapid degradation.

Materials, compositions, and components disclosed herein can be used for, can be used in conjunction with, can be used in preparation for, or are products of the disclosed methods and compositions. It is understood that when combinations, subsets, interactions, groups, etc. of these materials are disclosed that while specific reference of each various individual and collective combinations and permutations of these compounds may not be explicitly disclosed, each is specifically contemplated and described herein. For example, if a method is disclosed and discussed and a number of modifications that can be made to a number of molecules including in the method are discussed, each and every combination and permutation of the method, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed compounds or compositions. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

Applicant's disclosure is described herein in preferred embodiments with reference to the figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description, herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

The invention claimed is:
1. A compound having the structural formula:

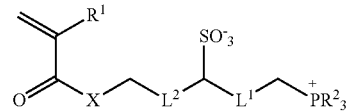

wherein
X is O or NH,
$R^1$ is H or a methyl,
each $R^2$ is independently an alkyl or aryl group,
$L^1$ is $(CH_2)_i$, wherein i is an integer selected from 1 and 2, and
$L^2$ is $(CH_2)_j$, wherein j is an integer selected from 0 to 6.
2. The compound of claim 1, wherein X is O.
3. The compound of claim 1, wherein X is NH.
4. The compound of claim 1, wherein $R^1$ is H.
5. The compound of claim 1, wherein $R^1$ is a methyl group.
6. The compound of claim 1, wherein each $R^2$ is a $C_1$-$C_{18}$ alkyl group.
7. The compound of claim 1, wherein each $R^2$ is an aryl group.
8. The compound of claim 1, wherein the $R^2$ groups are the same.
9. The compound of claim 1, wherein the $R^2$ groups are not the same.
10. The compound of claim 1, wherein i is an integer selected from 1-2.
11. The compound of claim 10, wherein j is an integer selected from 0-3.

* * * * *